United States Patent
Abdelsalam et al.

(10) Patent No.: US 12,164,433 B2
(45) Date of Patent: Dec. 10, 2024

(54) CACHE DATA PROVIDED BASED ON DATA AVAILABILITY

(71) Applicant: Microsoft Technology Licensing, LLC, Redmond, WA (US)

(72) Inventors: Ahmed Abdelsalam, Vancouver (CA); Ezzeldin Hamed, Redmond, WA (US); Robert Groza, Jr., Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/707,401

(22) Filed: Mar. 29, 2022

(65) Prior Publication Data
US 2023/0315643 A1    Oct. 5, 2023

(51) Int. Cl.
*G06F 12/08* (2016.01)
*G06F 12/0891* (2016.01)
*G06F 12/12* (2016.01)
*G06F 12/123* (2016.01)

(52) U.S. Cl.
CPC ........ *G06F 12/0891* (2013.01); *G06F 12/123* (2013.01); *G06F 2212/1021* (2013.01)

(58) Field of Classification Search
CPC ............... G06F 12/0891; G06F 12/123; G06F 2212/1021
See application file for complete search history.

(56) References Cited

U.S. PATENT DOCUMENTS

| | | | |
|---|---|---|---|
| 5,404,483 A | 4/1995 | Stamm et al. | |
| 5,623,628 A | 4/1997 | Brayton et al. | |
| 5,706,467 A * | 1/1998 | Vishlitzky | G06F 12/123 711/E12.072 |
| 5,742,831 A | 4/1998 | Creta | |
| 5,761,506 A | 6/1998 | Angle et al. | |
| 5,778,434 A | 7/1998 | Nguyen et al. | |
| 7,284,096 B2 | 10/2007 | Schreter | |
| 7,380,063 B2 | 5/2008 | Horrigan et al. | |
| 9,250,908 B2 | 2/2016 | Vorbach et al. | |
| 10,157,132 B1 | 12/2018 | Fielding et al. | |
| 10,942,853 B2 | 3/2021 | Schumann et al. | |
| 2007/0157208 A1 | 7/2007 | Mendelson et al. | |
| 2007/0176939 A1* | 8/2007 | Sadowski | G09G 5/393 345/557 |
| 2012/0198171 A1* | 8/2012 | Chachad | G06F 13/1605 711/128 |

(Continued)

OTHER PUBLICATIONS

Scargall, Steve, "Persistent Memory Architecture", In Publication of Apress, Jan. 10, 2020, 457 Pages.

(Continued)

*Primary Examiner* — Masud K Khan
(74) *Attorney, Agent, or Firm* — Schwegman Lundberg & Woessner, P.A.

(57) ABSTRACT

A computer implemented method includes receiving a first request at a cache for first data and checking the cache for the first data. In response to the first data residing in the cache, the first data is provided from the cache. In response to the first data not residing in the cache, a first memory request is sent to memory for the first data, a first request pending bit to is set indicate the first request is pending, and the cache proceeds to process a next request for second data.

20 Claims, 8 Drawing Sheets

(56) References Cited

U.S. PATENT DOCUMENTS

2014/0136784 A1     5/2014   Colglazier
2014/0244920 A1     8/2014   Biswas et al.
2016/0323407 A1*   11/2016   de los Reyes Darias ..................
                                                        H04L 12/1877
2021/0406184 A1*   12/2021   Mathur .................... G06F 9/383
2022/0229783 A1*    7/2022   Piry ........................ G06F 18/22

OTHER PUBLICATIONS

Aasaraai, et al., "An Efficient Non-blocking Data Cache for Soft Processors", In Proceedings of International Conference on Reconfigurable Computing and FPGAs, Dec. 13, 2010, pp. 19-24.
"International Search Report and Written Opinion Issued in PCT Application No. PCT/US2022/052611", Mailed Date: Apr. 13, 2023, 11 Pages.
PCT/US2022/052611, Dec. 13, 2022.

* cited by examiner

CACHE DATA PROVIDED BASED ON DATA AVAILABILITY

BACKGROUND

Computers make use of memory to store information, such as data that may include instructions for processors. If processors have to wait for data, operation of the computer may be slower than desired. Memory that is fast enough to provide data to the processors as needed can be very expensive. Many computer systems utilize one or more cache memories.

A cache memory is faster memory that cannot hold all the information that might be needed by the processors. All the data needed may be stored in a cheaper and slower main memory or even secondary storage devices that can be even slower than main memory. As data is needed by the processors, data is moved into the cache memory from main memory. If information is needed that is not in the cache memory, a cache miss may be encountered in response to a request for the data. A cache miss causes a read request to be sent to main memory, resulting in the data being eventually provided to the cache.

Expensive cache memories are generally smaller and faster memories than main memory. Cache memories are widely used in computing systems. The main purpose of utilizing cache memories is to bring data from the main memory closer to the processing unit to enhance the speed at which the data is provided to the processors.

Since processing units access the whole main memory through the cache, this mapping causes the cache misses to occur. Therefore, cache allocation and de-allocation schemes are used to allocate an entry in the cache for the new data coming from the main memory, fetch the required data from main memory, and replace data that is no longer needed in the cache, in which instances the cache memory is de-allocated.

Cache memories usually respond in the same order of the incoming requests. For example, assume the cache has data A and data B stored. Assume further that the incoming requests are in the following order data A, data C and data B. The cache responds with data A since it is a cache "hit", then the cache tries to serve the request for data C. It is a cache "miss", so it fetches data C from main memory by sending a request and it keeps waiting until it gets data C back. Although the following request is for data B, which is a cache "hit", the cache waits until data C is provided before proceeding to provide data B, resulting in a delay even though data B was already in the cache.

SUMMARY

A computer implemented method includes receiving a first request at a cache for first data and checking the cache for the first data. In response to the first data residing in the cache, the first data is provided from the cache. In response to the first data not residing in the cache, a first memory request is sent to memory for the first data, a first request pending bit is set to indicate the first request is pending, and the cache proceeds to process a next request for second data.

DETAILED DESCRIPTION

Figure 1:
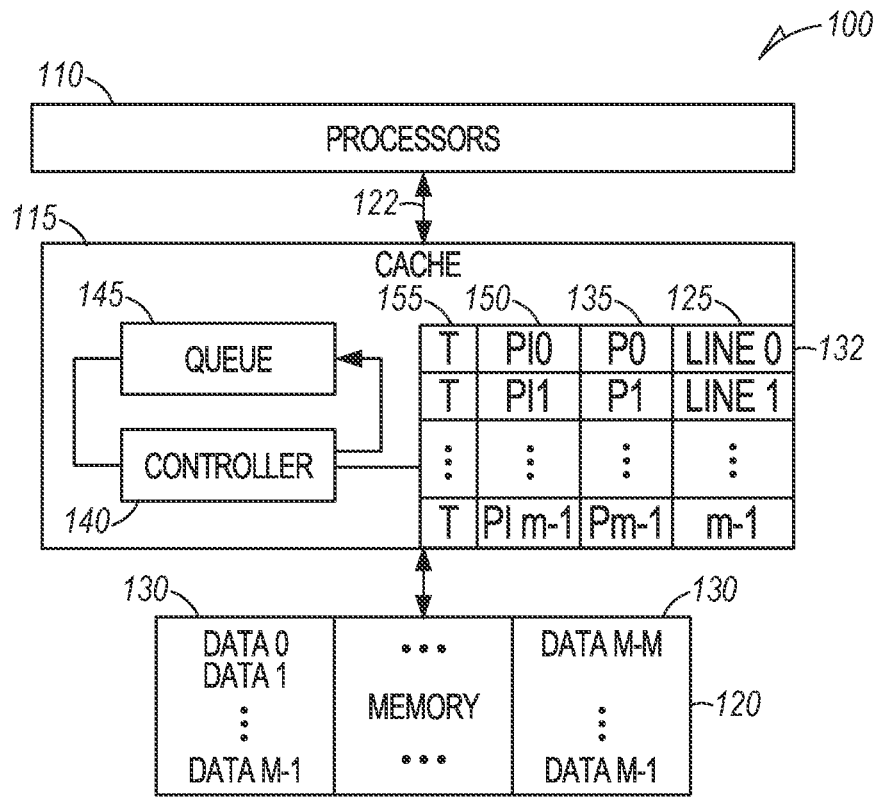
FIG. 1 is a block diagram of a simplified system for providing data from a cache as the data becomes available according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

An improved cache responds to incoming requests for data out-of-order to provide data as the data becomes available while not delaying other requests for data. In one example, the cache may respond to a first incoming request before responding to a next incoming request.

FIG. 1 is a block diagram of a simplified system 100 that includes one or more processors 110 that are coupled to a cache 115. The cache 115 may be coupled to a main memory 120.

The processors may request data from the cache 115 as indicated at 122. If the data is in the cache 115, a cache hit will be detected, and the cache will supply the data directly from the cache. If the requested data is not in the cache 115, a cache miss will be detected. The cache 115 will need to request the data from the main memory 120.

In one example, the cache 115 may be an associative cache containing "m" cache lines as indicated at 125. Each cache line 125 is associated with a corresponding line of data in each block of "M" blocks of data 130 in memory 120. For example, each block of data 130 contains m lines of data, each of which are the size of a cache line. The first line of data in each memory block comprising a set, "M" lines total, may be mapped to the cache line 132. Succeeding lines (sets) in main memory 120 blocks 130 may mapped to succeeding lines 125. The cache 115 has a size which is M times smaller than main memory and may hold only 1/Mth the data held in main memory 120. In further examples, the association of data in memory 120 may be associated with cache lines in a different manner.

In various examples, a respective request pending tag bit 135 may be associated with each cache line 132 in response to a cache miss for a first request for first data. A scheduling controller 140 may be used to control the operation of cache 115. The cache miss results in a main memory read request for the first data being sent to a main memory 120 from cache 115. A reservation or loop queue 145 is used to store read requests waiting for data to become available in the cache. The first read request is added to the loop queue 145. In response to the data becoming available, the data is provided in response the first read request.

Other requests in the loop queue 145 are processed, either resulting in a cache hit and the data being provided, or resulting in a cache miss, a read request being sent, and a corresponding pending bit being associated with the corresponding cache line.

The loop queue 145 may be a first-in-first-out queue. The first request may be encountered again while processing requests in the loop queue and taken from the loop queue. The corresponding request pending bit 135 may again be checked. If still set, the first request is added back to the queue 145 without generating a new main memory read request, as one is still pending. If the first data has become available, the data is provided from the cache responsive to the first request. A pending request may result in another memory read request that when scheduled results in the pending bit being set again.

In some examples, flushing the cache and/or invalidating parts of the cache is supported in a way that maintains the out-of-order service of the cache. An allocation and de-allocation algorithm determines where to allocate each data coming from main memory, which data to replace and the validity of each data in the cache. The cache takes care of incoming flush and/or invalidate requests while maintaining the out of order responses by a setting pending invalidate tag bit 150 for cache lines that have pending read requests, the Pending invalidate bits may result in requests being rescheduled in the loop queue 145, as the data currently residing in the corresponding cache line no longer includes the requested data. Once the line does contain the correct data, the invalidate bit for that line will be reset along with the pending bit 135. The pending bit 135 and invalidate bit 150 may be stored in a tag memory in one example along with tags T, at 155. Each tag 155 associates a line in the cache to a part of a set of data in main memory that maps to the cache line.

Figure 2:
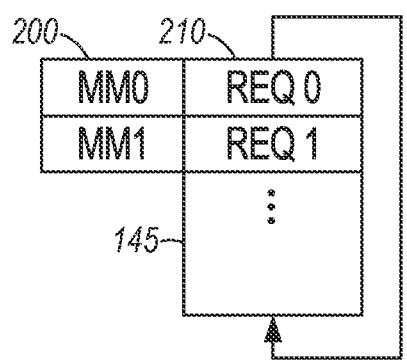
FIG. 2 is a block representation of the loop queue for queueing read requests according to an example embodiment.

FIG. 2 is a block representation of the loop queue 145. The cache may also set a main memory (MM) request bit 200 associated with each request 200 in the loop queue 145 to determine when to re-schedule a cache "miss" request. If a new request involves the same cache line as an existing request in the loop queue 145, the MM request pending bit 200 for the existing request will be detected, and the new request will be added to the loop queue without adding a main memory request or setting the request pending bit 200 for the corresponding cache line.

A request for data will include an input request address, which includes a tag field, a set field in the case of an associative cache, and a word field. All the information needed to locate the data in the cache data memory is given in the input request address. Parts of the input request address are used for locating data in the cache tag and data memories. The least significant bits (WORD) are used by the data manager to determine the word to start reading data from the corresponding cache line. If W is the number of words per cache line, then the word index has WORD=$\log_2$ W bits. The (SET) bits are used to determine the cache set. If S is the number of sets in the cache, then the set index has SET=$\log_2$ S bits. The remaining bits (TAG) are used for the tag. If L is the length of the address in bits, then the number of tag bits is TAG=L−SET−WORD.

The tags are stored in a tag memory 327, also represented at 125 in FIG. 1, that is organized in a way that optimizes the process of searching for a given request. The tag memory has S number of lines, where each line has the most recent corresponding K tags, where K is the number of associativity ways of the cache 115. Moreover, each set has a pending bit that indicates whether there is an ongoing main memory read request related to this set or not. Given an address, a tag manager (shown in FIG. 3) determines whether the requested data exists in the cache 115 or not. The read size is not used in the tag manager since the read size represents the number of requested words which does not affect the operation of the tag manager.

Figure 3:
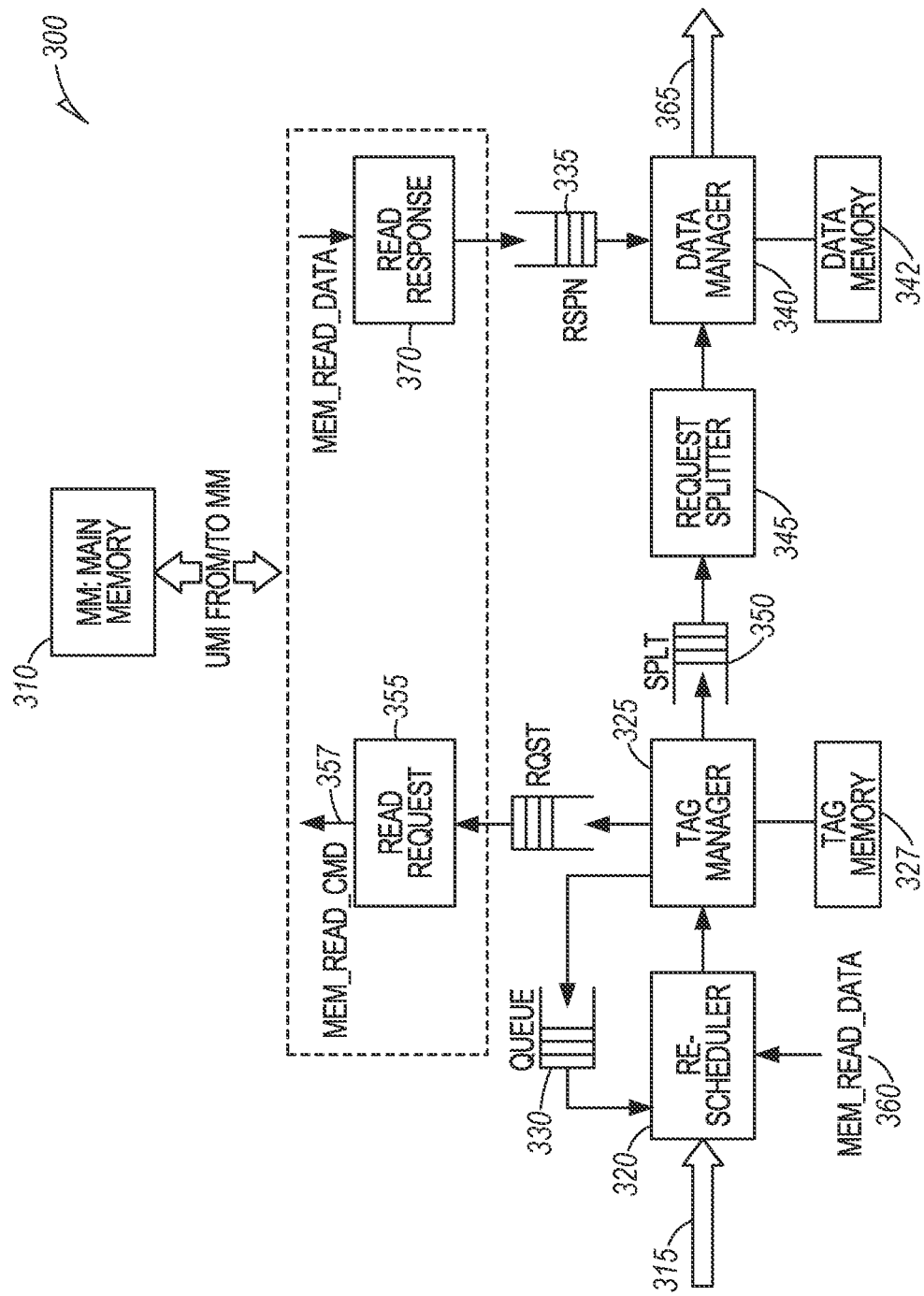
FIG. 3 is a function flow diagram of an example cache for providing data as data becomes according to an example embodiment.

FIG. 3 is a function flow diagram of an example cache indicated generally at 300 coupled to a main memory 310. Components of a scheduling controller are broken out to better illustrate functions performed. A cache input request 315 is received at a re-scheduler 320. The re-scheduler accepts new requests from a processor or user. Re-scheduler 320 sends received requests to a tag manager 325, which determines whether or not data requested is present in the cache, a cache hit, or is not present, a cache miss.

The re-scheduler 320 writes the cache miss requests from the tag manager to a queue 330. In addition, the re-scheduler 320 may check if the tag manager 325 is ready to accept a read request. Since the main memory latency of a given main memory read request is random, the re-scheduler 320 makes sure that the number of outstanding requests in the cache 300 does not exceed a specific limit (MAX_OUT-STANDING_REQUESTS). The re-scheduler 320 selects either a new input request or reads a re-scheduled request that had a prior cache miss from a queue 330 and passes the re-scheduled request to the tag manager 325. The queue 330 may be a loop first-in-first-out (FIFO) queue in one example.

The re-scheduler 320 is also responsible for syncing between the queue 330 and a response (RSPN FIFO) queue 335 to determine when to re-schedule a cache miss request once its corresponding data is ready in the RSPN FIFO queue 335.

The tag manager 325 accepts incoming requests from the re-scheduler 320 one by one and checks whether an incoming request is a cache hit/miss by comparing an address in each request to the corresponding addresses in the tag memory 125. Once a cache hit/miss decision is taken regarding an incoming request, the tag manager 325 passes the request to one of several different blocks.

When a cache hit is encountered, meaning that requested data is available in a cache line, the tag manager 325 generates the required signals for a data manager 340 to locate the corresponding data of the request in a data memory 342. The tag manager 325 may first pass information alongside with the request to a request splitter 345 to split the request into multi-requests according to the read size value. A split FIFO queue 350 may queue the requests and information for the request splitter 345. In some examples, requests are limited to a size corresponding to a single cache line, obviating the need for splitting requests.

When a cache miss is encountered and the pending bit 135 of the corresponding set mapped to a cache line is 0, it means that there is no pending main memory read request regarding this set. Therefore, the tag manager 325 passes the request for generation of a read request 357 (MEM_READ_CMD) to bring the data from the main memory 310. A RQST queue 360 may buffer the request for a read request to ensure read request is sent when main memory 310 is available to receive such requests. The tag manager 325 also passes the same request to the re-scheduler 320 to store it in the queue 330 to re-schedule the request once the corresponding data is ready from the main memory as indicated by a MEM_READ_DATA signal 360.

When a cache miss is encountered and the pending bit 135 of the corresponding set is 1, it means that there is an ongoing read request to the main memory 310 regarding the same location. Therefore, the tag manager 325 passes the request to the re-scheduler 360 to store it in the queue 330 but does not request the data from the main memory 310 since the request to main memory is already pending. Once the data of the corresponding request is ready as indicated by MEM_READ_DATA 360, the re-scheduler 320 re-schedules that request again to the tag manager 325 to check whether it is a cache hit/miss. The request can still result in a cache miss after re-scheduling the same request since it is a set-associative cache, as many memory locations go to the same cache line.

The tag manager 325 is responsible for updating the tag memory 125 whether the request is a cache hit/miss using least recently used (LRU) techniques.

The request splitter 345 accepts the requests from the tag manager and writes them to the split FIFO queue 350. Hence, the request splitter 345 reads the requests from the split FIFO queue 350 one by one and splits each read request to multi-word read requests, if needed, according to the corresponding read size signal and whether the request is a cache hit/miss (response). In case of a cache hit, this implied that the corresponding data is available from the cache lines 125. Therefore, the request splitter 345 splits the incoming request to N requests, where N is equal to (READ SIZE+1) of the corresponding request. In case of a cache miss, this implies that the corresponding data is available in the RSPN FIFO 335. Therefore and no matter the value of READ SIZE is, the request splitter 345 splits the incoming request to N request, where N is equal to ($2^{no.\ of\ bit\ of\ (READ\ SIZE)}$). This is mainly because in case of a cache miss, the main memory 310 provides all the words per a cache line which need ($2^{no.\ of\ bit\ of\ (READ\ SIZE)}$) clock cycles to be written in the data memory 310. Moreover, the request splitter 345 sets a signal to the data manager that controls whether the split request is read/write/read and write.

The data manager 340 accepts the split requests one by one from the request splitter 345 and does one of the following processes to each split request.

For reads, in case of a cache hit, the data manager 340 reads the corresponding data from the cache line of the incoming split request and passes the read data to an output port 365 of the cache 300, which may be a read only cache in one example.

For writes, in case of a cache miss and it is not a requested word, the data manager 340 writes the corresponding data from the RSPN FIFO queue 335 to the corresponding location in the data memory.

In case of a cache miss and a read/write is a requested, the data manager 340 writes the corresponding data from the RSPN FIFO que 335 to the corresponding location in the cache line 125. Moreover, the data manager 340 latches the same data to the output port 365 of the cache 300.

Once the data manager 340 completes a given request cache hit/miss (which might be a single or several split requests), it sets an OPERATION COMPLETE signal to the re-scheduler 320 to synchronize the maximum outstanding requests in the read-only cache 300.

The read request block 355 handles the read requests of the cache misses to the main memory 310 to retrieve their corresponding data to the cache line. The read request block 355 reads the cache misses requests from the tag manager 325 and stores them in the RQST FIFO queue 360. Once the main memory 310 is ready to serve the cache 300, the read request block 355 reads one request from the RQST FIFO queue 360 and passes it to the main memory 310. The request to the main memory has the following information:

TAG and SET of the cache miss read request. The read request block 355 does not pass the required WORD since the main memory retrieves all the words per TAG and SET address data block to the data memory.

A read response block 370 connects a main memory response 375 (MEM_READ_DATA) to the data manager 340 since the main memory 310 feeds the data as a full word per clock cycle. In one example, the read response block 370 may also include function to perform data organization and concatenation if the main memory 310 requires more than one clock cycle to retrieve a single word.

Figure 4:
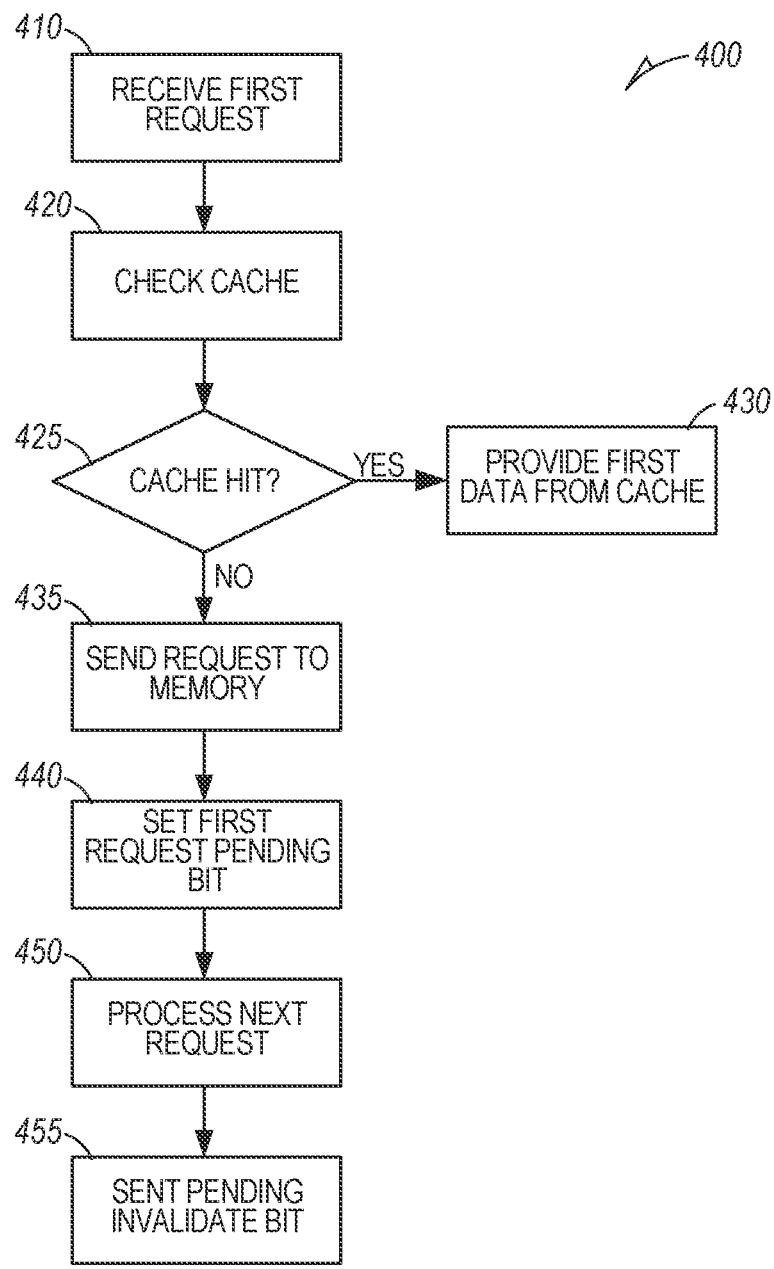
FIG. 4 is a flowchart illustrating a computer implemented method of continuously processing cache requests as a function of data becoming available in the in cache according to an example embodiment.

FIG. 4 is a flowchart illustrating a computer implemented method 400 of continuously processing cache requests as a function of data becoming available in the in cache regardless of whether a cache hit or miss is encountered. Method 400 begins at operation 410 by receiving a first request at a cache for first data. The cache is checked at operation 420 for the first data. In response to the first data residing (YES) in the cache at decision operation 425, operation 430 provides the first data from the cache.

In response to the first data not residing (NO) in the cache at operation 425, operation 435 sends a first memory request to memory for the first data. A first request pending bit is set at operation 440 to indicate the first request is pending. The first request pending bit may be added to a tag memory. At operation 450, method 400 proceeds to process a next request for second data.

The use of request pending bits allows incoming read requests to be served in an order corresponding to the availability of requested data in the cache. Read requests are satisfied in an order according to the availability of data in the cache, without having to wait for a previous request to be satisfied before processing subsequent read requests.

In one example, a read response may be received indicating that the first data has been provided to the cache and is now available. In response to receipt of the read response, the first data from the cache may be provided.

In one example, at operation 455, a request pending invalidate bit associated with the first request pending bit may be set to indicate that the first data is invalid to preclude the first data from being provided. This may occur due to a cache flush occurring, or if the data in the cache is overwritten with other data. The invalidate bit ensures that the pending bit does not result in reading of data in the cache that may not be correct.

Figure 5:
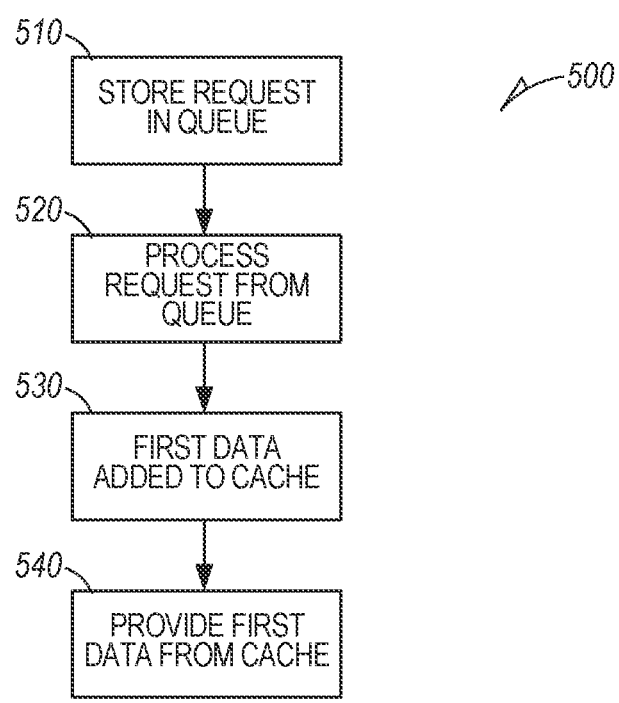
FIG. 5 is a flowchart illustrating a computer implemented method of processing a cache miss according to an example embodiment.

FIG. 5 is a flowchart illustrating a computer implemented method 500 of processing a cache miss. Method 500 begins in response to the first data being found to not reside in the cache. At operation 510 the first request is stored in a loop queue that may include previously received requests. The requests in the loop queue are processed at operation 520. At block 530, the first data has been added to the cache. Method 500 then determines that the first data has been added to the cache and provides the first data from the cache at operation 540.

Figure 6:
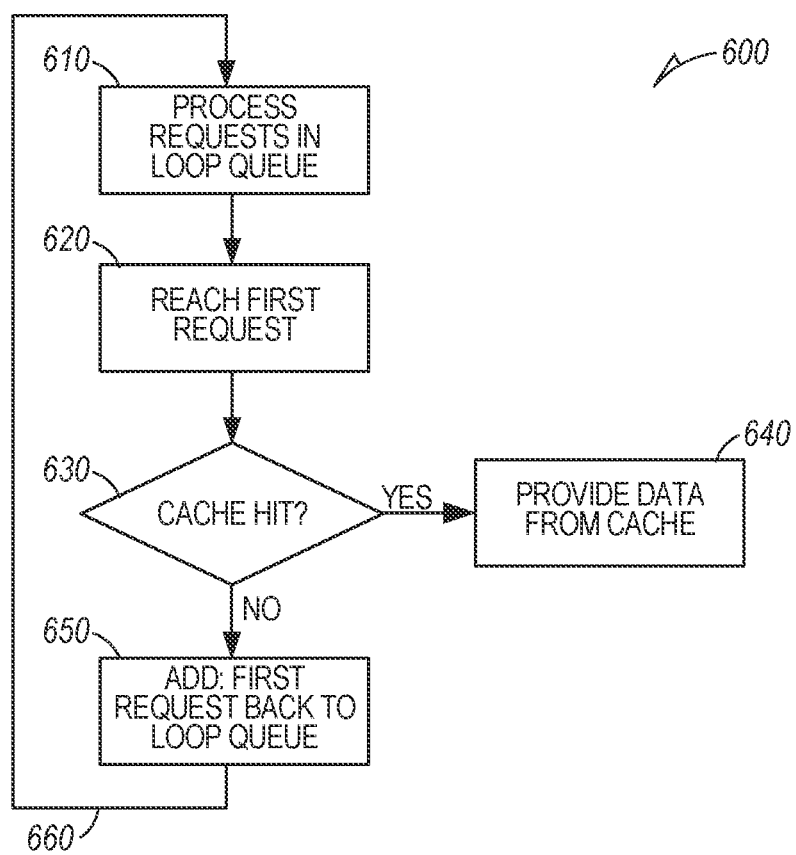
FIG. 6 is a flowchart illustrating a computer implemented method for processing data not residing the in cache according to an example embodiment.

FIG. 6 is a flowchart illustrating a computer implemented method 600 for processing data not residing in the cache. Method 600 starts with the loop queue already including the first request that had encountered a cache miss. In one example, the loop queue comprises a first-in-first-out queue.

The requests in the loop queue are processed in a FIFO manner at operation 610. At operation 620, the first request in the loop queue is reached. In response to the first data residing (YES) in the cache determined at decision operation 630, the first data is provided from the cache at operation 640.

In response to the first data not residing (NO) in the cache at decision operation 630, the first requested is added back to the loop queue at operation 650 and the method proceeds at 660 back to operation 610.

In one example, a read response may be received indicating that the first data has been provided to the cache and is now available. In response to receipt of the read response, the first data from the cache may be provided prior to the first request being reached in normal processing of the queue at 610.

Figure 7:
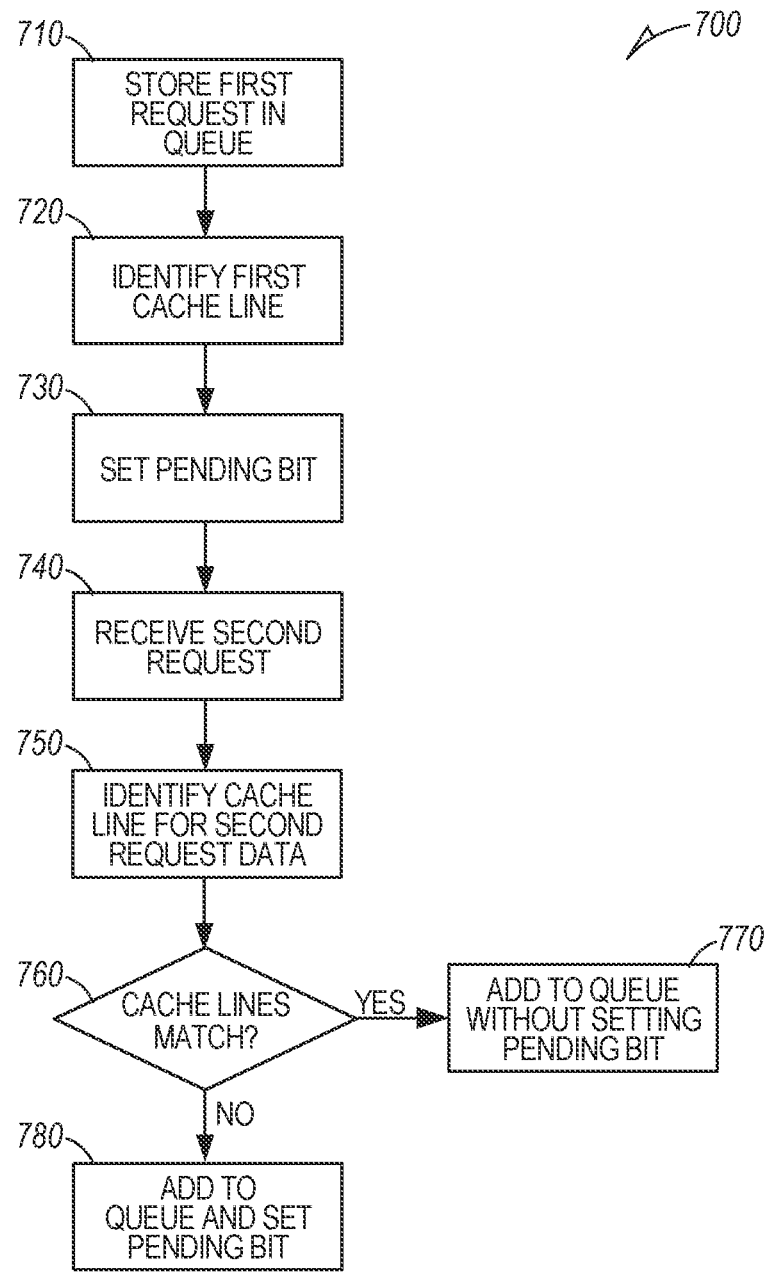
FIG. 7 is a flowchart illustrating a computer implemented method in response to the first data not residing in the cache according to an example embodiment.

FIG. 7 is a flowchart illustrating a computer implemented method 700 in response to the first data not residing in the cache at operation 425. At operation 710, the first request is stored in a loop queue. A first cache line is identified at operation 720 as a location in the cache where the first data will be stored. At operation 730, a request pending bit for the first request that is associated with the first cache line is set.

At operation 740, a second request for further data resulting in cache miss is received. A corresponding cache line is identified for the further data at operation 750. In response to the corresponding cache line matching (YES) the first cache line at decision operation 760, the further request is stored in the loop queue at operation 770 for read requests without setting the request pending bit for the second request. The second request will then rotate through the queue for processing, and if the pending bit is no longer set for the first request, the second request will then be processed, or if still set, added back to the loop queue. If at decision operation 760, the cache lines do not match, the second request will be added to the loop queue and a corresponding pending bit will be set at operation 780.

Figure 8:
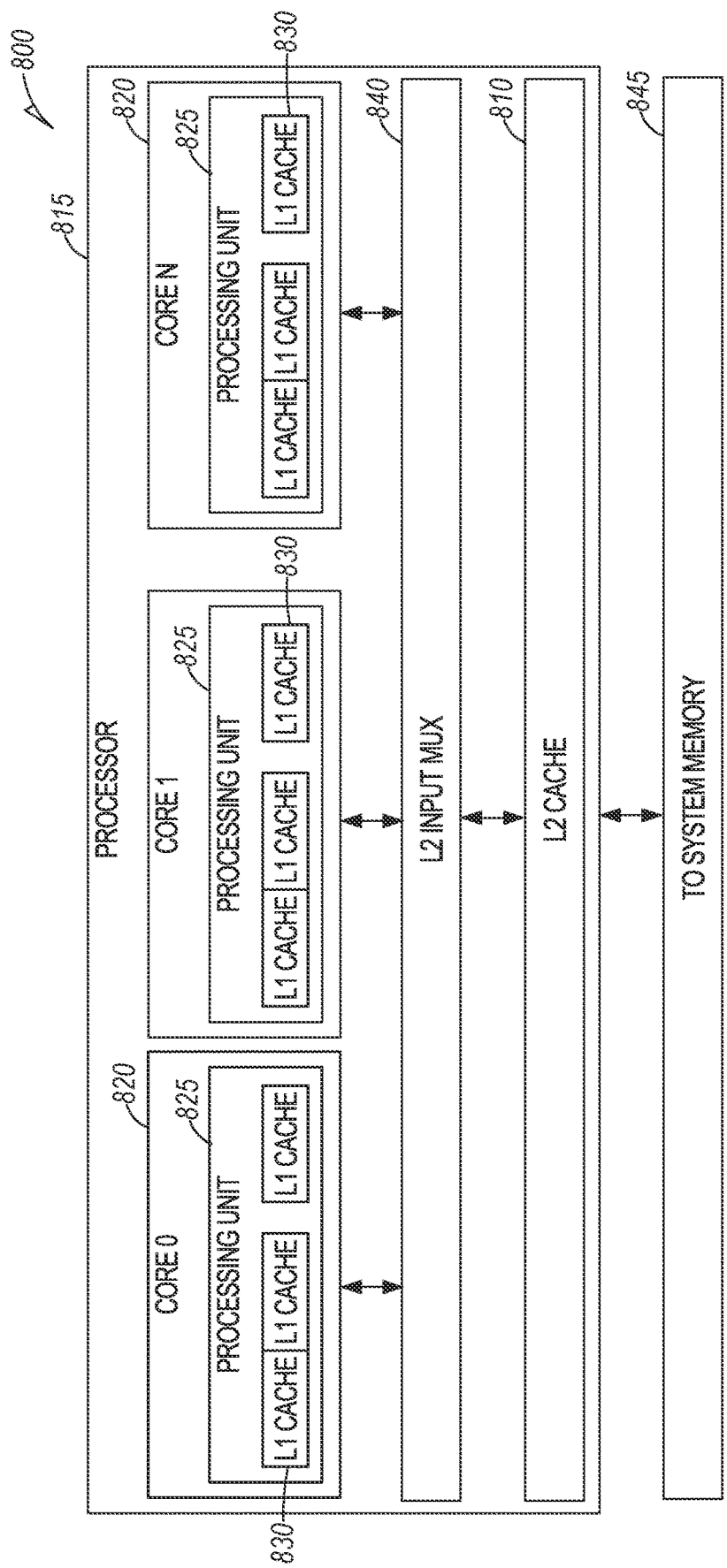
FIG. 8 is a block diagram of a system that makes use of an L2 (Level 2) cache according to an example embodiment.

FIG. 8 is a block diagram of a system 800 that makes use of an L2 (Level 2) cache 810 that can provide data responsive to requests received from a processor 815 In one example, the processor 815 includes multiple cores 820 that each include a processing 825 running multiple threads 830. Each core 820 may also include an L1 cache 830. In one example, the L1 caches are smaller than the L2 cache 810 and hold even less data.

The core processing units 825 may generate the data requests to the L2 cache 810 that are handled in the manner described above. Since multiple processing core units 825 are issuing requests, an L2 input multiplexor 840 may be used to coordinate requests to and data returned from the L2 cache 810. Also shown is the main memory 845 that receives L2 read requests and returns corresponding data to the L2 cache 810.

In one example, system 800 is a processor instruction cache system that is used to fetch instructions from memory 845 (shared system memory) to a cache system that includes the L2 cache 810. L1 cache 830, and multiplexor 840. The L2 cache 810 is connected to the main memory 845 via memory interface in one example and is shared among different L1 caches. The L2 cache input multiplexor (MUX) 840 serves as an arbiter that handles all the requests that are coming from different L1 caches to L2 cache. The L1 cache 830 is the core processor 820 instruction cache. The rule offload processor is a multi-core multi-threading processor. Therefore, each core 825 has its own corresponding L1 cache 830. Moreover, each L1 cache is shared among different threads within the same core.

In one example, L2 cache 810 is a read-only (RO) out-of-order L2 cache (ROCache) cache memory that is used for storage of data that does not require modification by users. The ROCache is shared among different users where it allows them to perform their read operations independently. The ROCache handles all the incoming read requests and serves them in an order governed by the availability of the requested data in the cache rather than by their original order. By doing so, the ROCache can avoid being idle while waiting for the requested data of a cache miss request to come from the main memory. In the meantime, the ROCache tries to serve other read requests in which their data is available in the cache (cache hits) and can be served immediately and independently.

Figure 9:
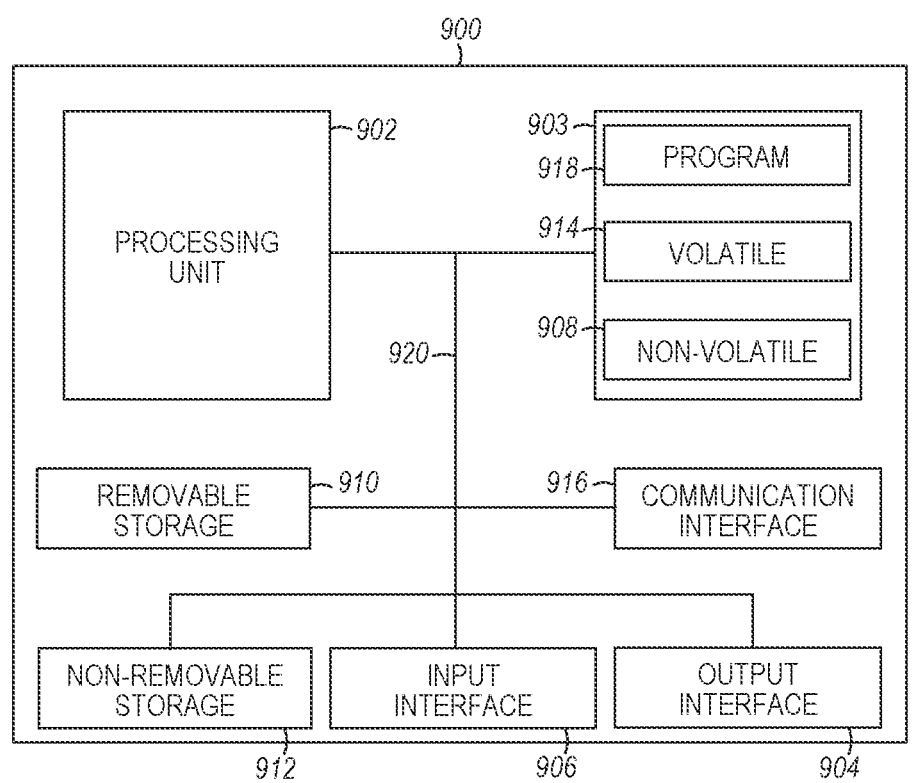
FIG. 9 is a block schematic diagram of a computer system to implement one or more example embodiments.

FIG. 9 is a block schematic diagram of a computer system 900 to perform computer implemented methods of providing data from a cache as the data becomes available and for performing methods and algorithms according to example embodiments. All components need not be used in various embodiments.

One example computing device in the form of a computer 900 may include a processing unit 902, memory 903, removable storage 910, and non-removable storage 912. Although the example computing device is illustrated and described as computer 900, the computing device may be in different forms in different embodiments. For example, the computing device may instead be a smartphone, a tablet, smartwatch, smart storage device (SSD), or other computing device including the same or similar elements as illustrated and described with regard to FIG. 9. Devices, such as smartphones, tablets, and smartwatches, are generally collectively referred to as mobile devices or user equipment.

Although the various data storage elements are illustrated as part of the computer 900, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 903 may include volatile memory 914 and non-volatile memory 908. Computer 900 may include—or have access to a computing environment that includes—a variety of computer-readable media, such as volatile memory 914 and non-volatile memory 908, removable storage 910 and non-removable storage 912. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 900 may include or have access to a computing environment that includes input interface 906, output interface 904, and a communication interface 916. Output interface 904 may include a display device, such as a touchscreen, that also may serve as an input device. The input interface 906 may include one or more of a touchscreen, touchpad, mouse, keyboard, camera, one or more device-specific buttons, one or more sensors integrated within or coupled via wired or wireless data connections to the computer 900, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular. Wi-Fi, Bluetooth, or other networks. According to one embodiment, the various components of computer 900 are connected with a system bus 920.

Computer-readable instructions stored on a computer-readable medium are executable by the processing unit 902 of the computer 900, such as a program 918. The program 918 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 918 along with the workspace manager 922 may be used to cause processing unit 902 to perform one or more methods or algorithms described herein.

Examples

1. A computer implemented method includes receiving a first request at a cache for first data and checking the cache for the first data. In response to the first data residing in the cache the method includes providing the first data from the cache. In response to the first data not residing in the cache the method includes sending a first memory request to memory for the first data, setting a first request pending bit to indicate the first request is pending, and proceeding to process a next request for second data.
2. The method of example 1 wherein the first request pending bit is added to a tag memory.
3. The method of any of examples 1-2 and further including in response to the first data not residing in the cache, storing the first request in a loop queue with other requests, and processing requests in the loop queue. In response to the first data being added to the cache, determining that the first data has been added to the cache, and providing the first data from the cache.
4. The method of any of examples 1-3 and further including in response to the first data not residing in the cache, storing the first request in a loop queue with other requests, processing requests in the loop queue, and reaching the first request in the loop queue. In response to the first data residing in the cache, providing the first data from the cache. In response to the first data not residing in the cache, adding the first request back to the loop queue.
5. The method of example 4 wherein the loop queue comprises a first-in-first-out queue.
6. The method of any of examples 1-5 and further including setting a request pending invalidate bit associated with the first request pending bit to indicate the first data is invalid to preclude the first data from being provided.
7. The method of any of examples 1-6 and further including receiving a read response indicating that the first data has been provided to the cache and providing the first data from the cache in response to the request.
8. The method of any of examples 1-7 and further including receiving additional requests at the cache, and wherein the additional and first requests are served in an order corresponding to the availability of requested data in the cache.
9. The method of any of examples 1-8 and further including in response to the first data not residing in the cache, storing the first request in a loop queue, identifying a first cache line as a location in the cache where the first data will be stored, and setting read request bit for the first request that is associated with the first cache line.

10. The method of example 9 and further including receiving a request for further data resulting in cache miss and identifying a corresponding cache line for the further data. In response to the corresponding cache line matching the first cache line, storing the further request in a loop queue for read requests.

11. The method of example 10 wherein read requests are satisfied in an order according to the availability of data in the cache.

12. A machine-readable storage device having instructions for execution by a processor of a machine to cause the processor to perform operations to perform any of the methods of examples 1-11.

13. A device includes a processor and a memory device coupled to the processor and having a program stored thereon for execution by the processor to perform operations to perform any of the methods of examples 1-11.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
   receiving a first request at a cache for first data;
   checking memory of the cache for the first data;
   in response to the first data not residing in the memory of the cache:
   sending a first memory request from the cache to a main memory for the first data;
   storing the first memory request in a cache memory request queue of the cache;
   setting a first request pending bit in the cache memory request queue to indicate the first request is pending; and
   proceeding to process a next request for second data received at the cache while the first request is still pending.

2. The method of claim 1 wherein the first request pending bit is added to a tag memory.

3. The method of claim 1 wherein the cache memory request queue is a loop queue that includes other memory requests, and further comprising in response to the first data not residing in the cache:
   processing requests in the loop queue; and
   in response to the first data being added to the cache:
   determining that the first data has been added to the cache; and
   providing the first data from the cache.

4. The method of claim 1 wherein the cache memory request queue is a loop queue that includes other memory requests, and further comprising in response to the first data not residing in the cache:
   processing requests in the loop queue;
   reaching the first request in the loop queue;
   in response to the first data residing in the cache:
   providing the first data from the cache; and
   in response to the first data not residing in the cache, adding the first request back to the loop queue.

5. The method of claim 4 wherein the loop queue comprises a first-in-first-out queue.

6. The method of claim 1 and further comprising setting a request pending invalidate bit associated with the first request pending bit to indicate the first data is invalid to preclude the first data from being provided.

7. The method of claim 1 and further comprising:
   receiving a read response indicating that the first data has been provided to the cache; and
   providing the first data from the cache in response to the request.

8. The method of claim 1 and further comprising receiving additional requests at the cache, and wherein the additional and first requests are served in an order corresponding to the availability of requested data in the cache.

9. The method of claim 1 wherein the cache memory request queue is a loop queue that includes other memory requests, and further comprising in response to the first data not residing in the cache:
   identifying a first cache line as a location in the cache where the first data will be stored; and
   setting read request bit for the first request that is associated with the first cache line.

10. The method of claim 9 and further comprising:
    receiving a request for further data resulting in cache miss;
    identifying a corresponding cache line for the further data;
    in response to the corresponding cache line matching the first cache line:
    storing the further request in a loop queue for read requests.

11. The method of claim 10 wherein read requests are satisfied in an order according to the availability of data in the cache.

12. A machine-readable storage device having instructions for execution by a processor of a machine to cause the processor to perform operations to perform a method, the operations comprising:
    receiving a first request at a cache for first data;
    checking memory of the cache for the first data;
    in response to the first data not residing in the memory of the cache:
    sending a first memory request from the cache to a main memory for the first data;
    storing the first memory request in a cache memory request queue of the cache;
    setting a first request pending bit in the cache memory request queue to indicate the first request is pending; and
    proceeding to process a next request for second data received at the cache while the first request is still pending.

13. The device of claim 12 wherein the cache memory request queue is a loop queue that includes other memory requests, and wherein the operations further comprise in response to the first data not residing in the cache:
    processing requests in the loop queue; and
    in response to the first data being added to the cache:
    determining that the first data has been added to the cache; and
    providing the first data from the cache.

14. The device of claim 12 wherein the cache memory request queue is a loop queue that includes other memory requests, and wherein the operations further comprise in response to the first data not residing in the cache:

processing requests in the loop queue;
reaching the first request in the loop queue;
in response to the first data residing in the cache:
providing the first data from the cache; and
in response to the first data not residing in the cache, adding the first request back to the loop queue in response to the first request pending bit being set.

15. The device of claim 14 wherein the operations further comprise setting a request pending invalidate bit associated with the first request pending bit to indicate the first data is invalid to preclude the first data from being provided.

16. The device of claim 12 wherein the operations further comprise:
receiving a read response indicating that the first data has been provided to the cache; and
providing the first data from the cache in response to the request.

17. The device of claim 12 wherein the cache memory request queue is a loop queue that includes other memory requests, and wherein the operations further comprise in response to the first data not residing in the cache:
identifying a first cache line as a location in the cache where the first data will be stored; and
setting read request bit for the first request that is associated with the first cache line.

18. The device of claim 17 wherein the operations further comprise:
receiving a request for further data resulting in cache miss;
identifying a corresponding cache line for the further data;
in response to the corresponding cache line matching the first cache line:
storing the further request in a loop queue for read requests, wherein read requests are satisfied in an order according to the availability of data in the cache.

19. A device comprising:
a processor; and
a memory device coupled to the processor and having a program stored thereon for execution by the processor to perform operations comprising:
receiving a first request at a cache for first data;
checking memory of the cache for the first data;
in response to the first data not residing in the memory of the cache:
sending a first memory request from the cache to a main memory for the first data;
storing the first memory request in a cache memory request queue of the cache;
setting a first request pending bit in the cache memory request queue to indicate the first request is pending; and
proceeding to process a next request for second data received at the cache while the first request is still pending.

20. The device of claim 19 wherein the cache memory request queue is a loop queue that includes other memory requests, and wherein the operations further comprise in response to the first data not residing in the cache:
processing requests in the loop queue; and
in response to the first data being added to the cache:
determining that the first data has been added to the cache; and
providing the first data from the cache.

* * * * *